Patented Jan. 6, 1931

1,787,754

UNITED STATES PATENT OFFICE

ELIZABETH MARY MEYER, OF SHERMAN, PENNSYLVANIA

METHOD OF EXTRACTING ALBUMIN AND SUGAR FROM MILK WHEY

No Drawing.    Application filed April 16, 1929.  Serial No. 355,667.

My present invention relates to a method of extracting albumin and milk sugar from milk whey whereby I am able to salvage from milk whey two principal food products contained in it, namely albumin and milk sugar, and produce a product which is substantially free of the heavy salts present in milk whey including calcium salts, phosphates and phosphites. My final product, by reason of the absence of said salts, can be readily dissolved in water to form a solution that can be whipped to form a light standing froth or meringue similar to that which is obtained by the use of white of egg and is, therefore, an excellent substitute for white of egg for baking purposes.

My invention also contemplates removal of any slightly bitter aftertaste of the final product, which might otherwise occur when using some types of whey due to traces of salts such as phosphites remaining in the final product.

Generally speaking my method consists in mixing with milk whey a small percentage of properly slaked hydrate of lime, allowing the mixture to divide into two portions, the bottom one of which is of a creamy consistency while the supernatant one is substantially clear; and then drawing off the supernatant portion containing albumin and milk sugar which can be used without further treatment or can be thickened by partial evaporation or may be evaporated to dryness. The product so obtained is readily soluble in water and when beaten forms a light standing froth, resembling the froth of white of egg. To avoid any objectionable flavor of the final product, occuring with some types of whey when using the above method, water may be incorporated with the hydrate of lime and the whey after the two latter compounds have been thoroughly mixed. Preferably, however, to remedy any trace of bitterness or objectionable flavor remaining in the final product, my method of treatment comprises the addition of a small percentage of nitrate of potash to the whey, prior to the hydrate of lime treatment; when using the nitrate of potash, water may also be added preferably before the division of the mixture is allowed to take place.

More particularly stated, my method of extracting milk albumin and sugar from milk whey containing undesirable calcium salts, phosphates and phosphites may be described as follows: To 100 parts by weight of milk whey add 3 to 4 parts by weight of hydrate of lime prepared by slaking quick-lime with the smallest amount of water, as prescribed in U. S. P. specifications. 1 to 2 percent of nitrate of potash is added to the whey, this addition being effective in converting the phosphites present in the whey to phosphates which in this form are readily precipitated in the subsequent hydrate of lime treatment. The hydrate of lime should be stirred into the whey containing the nitrate of potash, and the stirring continued for at least three minutes. Water is then added slowly, stirring being continued until from 50 to 100 percent of the original amount of whey has been added. A white milky fluid is thus obtained which is really a mixture of two solutions, namely, an albumin-sugar solution and a lime solution carrying the undesirable salts which have been mostly broken up and have become dissolved in this lime solution. Upon discontinuing the stirring and as soon as the first frothing has subsided, any foam remaining on top should be promptly removed. Upon being left to settle, the two solutions comprising the mixture will gradually separate owing to their different specific gravity values, the bottom solution containing the heavy salts being of a creamy consistency, and the supernatant one being a substantially clear fluid which represents from about one-fifth to one-fourth of the quantity of whey used. This top liquid, which is the product desired, is carefully drawn off and should be allowed to stand for a time in open containers. The liquid product may be used as such or may be partly or entirely evaporated to dryness leaving a substantially white crystalline powder which is readily soluble in water. It is, of course, understood that any evaporation of the liquid, must be carried on at a temperature below the coagulating temperature of albumin; and that the milk whey must not have been heated prior to treatment by my method to a temperature higher than the coagulating temperature of albumin.

My method may be applied to any type of milk whey and in this respect, with some types of whey, the treatment by water alone will remove the limy aftertaste or other objectionable flavor of the final product. In these cases, my method of extracting milk albumin and sugar from milk whey is carried out identically as outlined above with the exception that the hydrate of lime, prepared as before, is directly added to the whey, without the incorporation of the nitrate of potash into the latter. As described before, the water is added slowly after the hydrate of lime has been thoroughly beaten into the whey for a few minutes.

Whether the nitrate of potash is used or not, the whey and the water should both be, preferably, very cold and it is desirable that the whey should be in as clean a condition as possible.

It is noted that the addition of water in either of the two cases of treatment for removal of objectionable aftertaste of the final product, namely the treatment by water alone and the treatment by both the nitrate of potash and the water, brings about a quicker separation of the two solutions in the mixture and furthermore produces a whiter dried product. This addition of water does not increase to any appreciable extent the clear supernatant fluid which contains the milk albumin and sugar but gives the hydrate of lime a greater freedom to thoroughly combine with the salts, acids and gases present in the whey.

As the amount of gases, salts and acids present in various types of milk whey differ somewhat, the quantity of hydrate of lime best suited to the carrying out of my method should be first determined by test. As a rule, hydrate of lime to the amount of 4 percent by weight of the whey will be found by this test to be sufficient and in some cases 3 or 3½ percent will be enough.

In carrying out my method, it is essential that the mixture of the two solutions thereby obtained be given sufficient time to separate in order to salvage all, or substantially all, of the albumin contained in the whey. When using either the water treatment or both the water and nitrate of potash treatment as a remedy for objectionable flavor of the final product, a period of less than 24 hours will be adequate in some cases to effect complete separation of the two solutions, after which time the supernatant solution should be drawn off carefully to avoid drawing off with it any portion of the creamy bottom fluid. Any crust forming during the period of separation should be carefully removed.

The fluid obtained by my method which contains principally albumin, milk sugar and water, can be beaten to a standing froth or meringue like white of egg and can be used for baking purposes. When the liquid is evaporated to dryness the crystalline powder thereby obtained is readily soluble in water and in suitable concentration produces a solution which like the original liquid may be whipped to form a light froth or meringue.

As sugar is used with white of egg in most if not all baking purposes, the presence of milk sugar in my product is not only unobjectionable, but is actually desirable.

Having thus described my invention what I claim is:

1. The method of extracting albumin and milk sugar from milk whey which consists in preparing a mixture of whey, a small amount of nitrate of potash and hydrate of lime, allowing the resulting solution to separate into two portions of different specific gravity, and separating the supernatant portion containing albumin and milk sugar.

2. The method of extracting albumin and milk sugar from milk whey which consists in preparing a mixture of whey, a small amount of nitrate of potash, hydrate of lime and a substantial amount of water, allowing the resulting solution to separate into two portions of different specific gravity, and separating the supernatant portion containing albumin and milk sugar.

3. The method of extracting albumin and milk sugar from milk whey which consists in preparing a mixture of whey, a small amount of hydrate of lime and a substantial amount of water, allowing the resulting solution to separate into two portions of different specific gravity, and separating the supernatant portion containing albumin and milk sugar.

4. The method of extracting albumin and milk sugar from milk whey which consists in preparing a mixture of whey, a small amount of nitrate of potash, hydrate of lime and a substantial amount of water, allowing the resulting solution to separate into two portions of different specific gravity, separating the supernatant portion, and evaporating the latter to a crystalline product containing albumin and milk sugar.

5. The method of extracting albumin and milk sugar from milk whey which consists in preparing a mixture of whey, hydrate of lime and a substantial amount of water, allowing the resulting solution to separate into two portions of different specific gravity, separating the supernatant portion and evaporating the latter to a crystalline product containing albumin and milk sugar.

6. The method of extracting albumin and milk sugar from milk whey which consists in adding a small amount of nitrate of potash to the whey, mixing hydrate of lime with the whey containing said nitrate of potash, slowly adding a substantial amount of water to the resulting mixture while stirring the latter, allowing the resulting solution to separate into a heavy creamy portion and a supernatant substantially clear portion, and separating the latter portion containing albumin and milk sugar.

7. The method of extracting albumin and milk sugar from milk whey which consists in mixing hydrate of lime with the whey, slowly adding a substantial amount of water to the resulting mixture while stirring the latter, allowing the resulting solution to separate into a heavy creamy portion and a supernatant substantially clear portion, and separating the latter portion containing albumin and milk sugar.

8. The method of extracting albumin and milk sugar from milk whey which consists in adding 1 to 2% of nitrate of potash to the whey, mixing about 3 to 4% by weight of hydrate of lime with the whey, slowly adding a substantial amount of water to the resulting mixture while stirring the latter, allowing the resulting solution to separate into a heavy creamy portion and a supernatant substantially clear portion, and separating the latter portion containing albumin and milk sugar.

9. The method of extracting albumin and milk sugar from milk whey which consists in mixing about 3 to 4% by weight of hydrate of lime with the whey, slowly adding a substantial amount of water to the resulting mixture while stirring the latter, allowing the resulting solution to separate into a heavy creamy portion and a supernatant substantially clear portion, and separating the latter portion containing albumin and milk sugar.

In testimony whereof, I have affixed my signature to this specification.

ELIZABETH MARY MEYER.